United States Patent
Kiire et al.

(10) Patent No.: US 12,315,266 B2
(45) Date of Patent: May 27, 2025

(54) POSITION DETECTION SYSTEM, POSITION DETECTION METHOD, AND THREE-DIMENSIONAL GEOMETRY MEASUREMENT SYSTEM

(71) Applicant: MITUTOYO CORPORATION, Kanagawa (JP)

(72) Inventors: Tomohiro Kiire, Tokyo (JP); Kazuhiko Hidaka, Tokyo (JP)

(73) Assignee: MITUTOYO CORPORATION, Kanagawa (JP)

( * ) Notice: Subject to any disclaimer, the term of this patent is extended or adjusted under 35 U.S.C. 154(b) by 621 days.

(21) Appl. No.: 17/747,034

(22) Filed: May 18, 2022

(65) Prior Publication Data

US 2022/0383642 A1 Dec. 1, 2022

(30) Foreign Application Priority Data

May 28, 2021 (JP) .................................. 2021-090263

(51) Int. Cl.
*G06V 20/58* (2022.01)
*B60W 60/00* (2020.01)

(52) U.S. Cl.
CPC ........... *G06V 20/58* (2022.01); *B60W 60/001* (2020.02); *B60W 2420/403* (2013.01); *B60W 2420/408* (2024.01); *B60W 2554/4041* (2020.02)

(58) Field of Classification Search
CPC ................ G06V 20/58; B60W 60/001; B60W 2554/4041
See application file for complete search history.

(56) References Cited

U.S. PATENT DOCUMENTS

| | | | |
|---|---|---|---|
| 2017/0282373 A1* | 10/2017 | Kondo | ..................... G10L 15/22 |
| 2018/0012373 A1 | 1/2018 | Ozaki | |
| 2021/0209793 A1 | 7/2021 | Ishii et al. | |
| 2021/0333384 A1 | 10/2021 | Yamazaki et al. | |

FOREIGN PATENT DOCUMENTS

| | | |
|---|---|---|
| JP | 2005-233639 | 9/2005 |
| JP | 2016-125956 | 7/2016 |
| JP | 2019-205060 A | 11/2019 |
| JP | 2020-112497 | 7/2020 |

* cited by examiner

*Primary Examiner* — Myron Wyche
(74) *Attorney, Agent, or Firm* — Greenblum & Bernstein, P.L.C.

(57) ABSTRACT

A position detection system includes: a plurality of distance detection apparatuses that generate distance data indicating distances to a plurality of positions on the object by detecting light reflected by the object in a predetermined three-dimensional space; an object identification part that identifies the object included in one or more pieces of distance data among a plurality of pieces of the distance data generated by the plurality of distance detection apparatuses; and a position identification part that identifies a position of the object in the three-dimensional space on the basis of (i) a position in the three-dimensional space of the distance detection apparatus that generated the distance data with which the object identification part identified the object and (ii) a position of the object in the distance data.

17 Claims, 10 Drawing Sheets

POSITION DETECTION SYSTEM, POSITION DETECTION METHOD, AND THREE-DIMENSIONAL GEOMETRY MEASUREMENT SYSTEM

CROSS-REFERENCE TO RELATED APPLICATIONS

The present application claims priority to the Japanese Patent Application number 2021-090263, filed on May 28, 2021. The contents of this application are incorporated herein by reference in their entirety.

BACKGROUND

The present disclosure relates to a position detection system for detecting a position of an object, a position detection method, and a three-dimensional geometry measurement system for measuring a geometry of an object.

Techniques of measuring a position of an object in space using a LiDAR device or a stereo camera are known.

Japanese Unexamined Patent Application Publication No. 2019-205060 discloses a technique of measuring a position of an object by calculating three-dimensional coordinates indicating a position of the object on the basis of a result of measuring a distance to the object using the LiDAR device or the stereo camera.

When another object exists between the LiDAR device or the stereo camera and an object to be measured, which is an object to be detected, light reflected off the object to be measured does not enter the LiDAR device or the stereo camera. As a result, there is a problem that a position of the object to be measured cannot be identified since the LiDAR device or the stereo camera cannot measure a distance to the object to be measured.

SUMMARY

The present disclosure has been made in view of this point, and its object is to enable a position of an object to be identified even when an obstacle exists in front of the object whose position is to be identified.

A position detection system according to a first aspect of the present disclosure is a position detection system for detecting a position of an object, including: a plurality of distance detection apparatuses that generate distance data indicating distances to a plurality of positions on the object by detecting light reflected by the object in a predetermined three-dimensional space; an object identification part that identifies the object included in one or more pieces of distance data among a plurality of pieces of the distance data generated by the plurality of distance detection apparatuses; and a position identification part that identifies a position of the object in the three-dimensional space on the basis of (i) a position in the three-dimensional space of the distance detection apparatus that generated the distance data with which the object identification part identified the object and (ii) a position of the object in the distance data.

A position detection system according to a second aspect of the present disclosure is a position detection system for detecting a position of an object, including a distance data acquisition part that acquires a plurality of pieces of distance data generated by a plurality of distance detection apparatuses that generate distance data indicating a distance to a position of the object by detecting light reflected by the object in a predetermined three-dimensional space; an object identification part that identifies the object included in one or more pieces of distance data among the plurality of pieces of distance data; a position identification part that identifies a position of the object in the three-dimensional space on the basis of (i) a position in the three-dimensional space of the distance detection apparatus that generated the distance data with which the object identification part identified the object and (ii) a position of the object in the distance data.

A three-dimensional geometry measurement system according to a third aspect of the present disclosure is a three-dimensional geometry measurement system having a probe for measuring a three-dimensional geometry of an object to be measured, including: a plurality of distance detection apparatuses that generates distance data indicating a distance to a position of the probe by detecting light reflected by the probe in a three-dimensional space in which the probe can move; an object identification part that identifies the probe included in one or more pieces of distance data among a plurality of pieces of the distance data generated by the plurality of distance detection apparatuses; a position identification part that identifies a position of the probe in the three-dimensional space on the basis of (i) a position in the three-dimensional space of the distance detection apparatus that generated the distance data with which the object identification part identified the object to be measured, and (ii) the position of the probe in the distance data; and a geometry identification part that outputs three-dimensional geometry data indicating a plurality of positions on the object to be measured separated by a difference between the position of the probe and the position of the object to be measured from a plurality of positions of the probe identified by the position identification part.

A position identifying method according to a fourth aspect of the present disclosure is a position detection method for detecting a position of an object, the method including the computer-implemented steps of: acquiring a plurality of pieces of distance data generated by a plurality of distance detection apparatuses that generates distance data indicating a distance to a position of the object by detecting light reflected by the object in a predetermined three-dimensional space; identifying the object included in one or more pieces of distance data among the plurality of pieces of distance data; and identifying a position of the object in the three-dimensional space on the basis of (i) a position in the three-dimensional space of the distance detection apparatus that generated the distance data with which the object is identified and (ii) a position of the object in the distance data.

DETAILED DESCRIPTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

[Outline of a Position Detection System 1]

Figure 1:
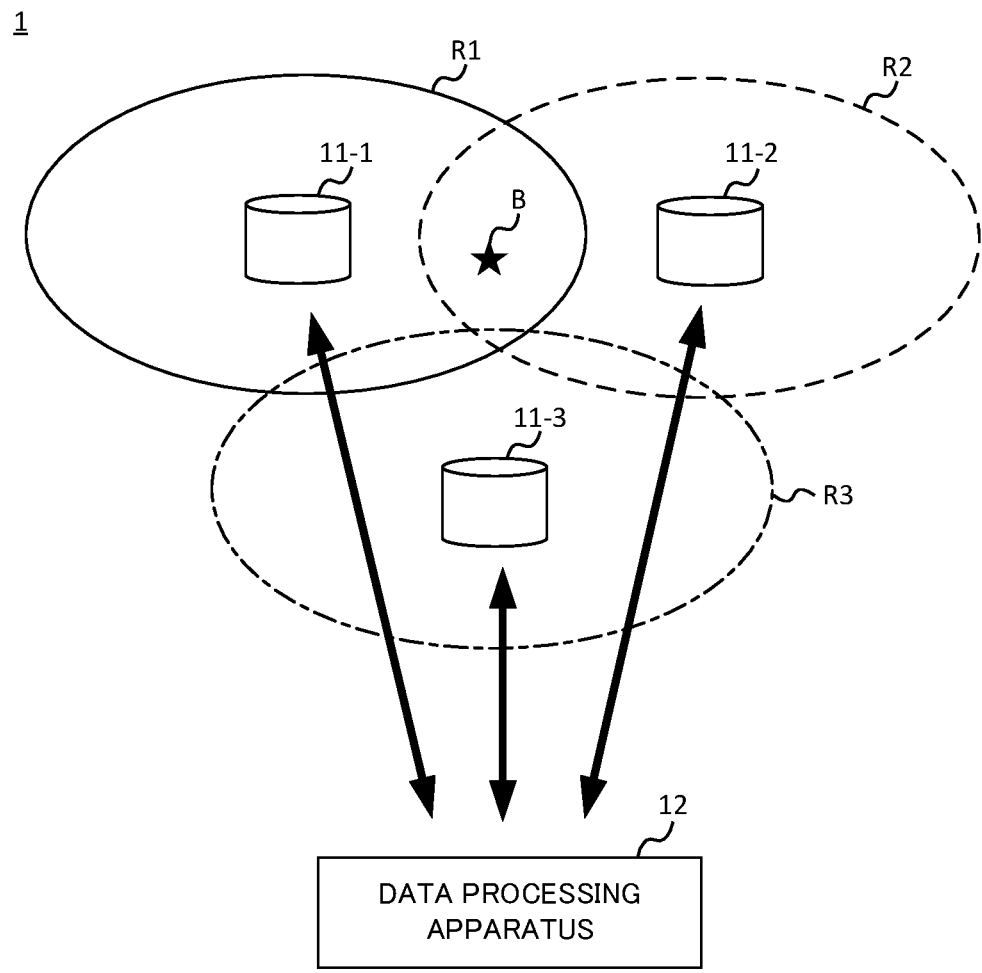
FIG. 1 illustrates an outline of a position detection system 1.

FIG. 1 illustrates an outline of a position detection system 1. The position detection system 1 includes a plurality of distance detection apparatuses 11 (distance detection apparatuses 11-1, 11-2, and 11-3), and a data processing apparatus 12.

The distance detection apparatus 11 is a LiDAR device or a stereo camera, and generates distance data indicating a distance to a position of an object (for example, an object B in FIG. 1) by detecting light reflected on the object B in a predetermined space. The predetermined space is a space where an object whose position is to be identified exists. The position in the predetermined space is represented by three-dimensional coordinates having a reference position in the predetermined space as the origin. The three-dimensional coordinates may be orthogonal coordinates or polar coordinates. In this disclosure, the three-dimensional coordinates are orthogonal coordinates (x, y, z).

When the distance detection apparatus 11 is a LiDAR device, the distance detection apparatus 11 emits a laser beam to at least some regions in the predetermined space while sequentially changing its orientation under the control of the data processing apparatus 12, and detects light reflected off an object in the predetermined space, for example. The distance detection apparatus 11 generates, on the basis of the time from when the laser beam is emitted to when reflected light is detected, distance data indicating a distance to the object in the orientation in which the laser beam is emitted. The plurality of distance detection apparatuses 11 each generate distance data indicating three-dimensional coordinates of a position at which the laser beam is reflected, with a reference position (hereinafter referred to as a local reference position) of the respective distance detection apparatuses 11 as the origin. The distance detection apparatus 11 notifies the data processing apparatus 12 of the generated distance data. The local reference position is a position of a light source included in the distance detection apparatus 11, for example.

Ranges, in which the plurality of distance detection apparatuses 11 can detect the distance to the object, (hereinafter referred to as distance detection ranges) are different from each other. In the example shown in FIG. 1, the distance detection range of the distance detection apparatus 11-1 is a region R1 indicated by a solid line, the distance detection range of the distance detection apparatus 11-2 is a region R2 indicated by a broken line, and the distance detection range of the distance detection apparatus 11-3 is a region R3 indicated by a dashed line.

The plurality of distance detection apparatuses 11 each generate distance data indicating three-dimensional coordinates of a position at which the laser beam is reflected on the object that exists in the respective distance detection ranges. The distance detection apparatus 11-1 generates distance data including a point cloud corresponding to a plurality of three-dimensional coordinates (x1, y1, z1) with an emission position of the laser beam in the distance detection apparatus 11-1 as the origin, at predetermined time intervals. The distance detection apparatus 11-2 generates distance data including a point cloud corresponding to a plurality of three-dimensional coordinates (x2, y2, z2) with an emission position of the laser beam in the distance detection apparatus 11-2 as the origin. The distance detection apparatus 11-3 generates distance data including a point cloud corresponding to a plurality of three-dimensional coordinates (x3, y3, z3) with an emission position of the laser beam in the distance detection apparatus 11-3 as the origin.

The data processing apparatus 12 identifies the position of the object that exists in a three-dimensional space on the basis of the distance data notified from the plurality of distance detection apparatuses 11. The data processing apparatus 12 is a computer that identifies a position of an object by executing a program, for example.

For example, the data processing apparatus 12 identifies whether or not the object B to be searched for exists in the three-dimensional space corresponding to the distance data by matching geometry data formed by connecting the point cloud included in the distance data and three-dimensional geometry data of the object stored in advance. The geometry data is data indicating a relative position of a feature point of the object, for example. A position of the feature point of the object B is a position of an edge of the object B, a position of a vertex of the object B, or a position where the curvature of the object B changes, for example. When identifying that the object B is present, the data processing apparatus 12 identifies three-dimensional coordinates corresponding to the position of the feature point of the object B in a three-dimensional space coordinate system.

The data processing apparatus 12 searches for the object B in a plurality of pieces of distance data. Since the plurality of distance detection apparatuses 11 installed at different positions generate a plurality of pieces of distance data, the data processing apparatus 12 can identify the position of the object B in the three-dimensional space even if the object B is not included in a given part of the distance data, as long as the object B is included in at least another part of the distance data. Therefore, the data processing apparatus 12 can identify the position of the object B even when there is an obstacle in front of the object B whose position is to be identified.

The plurality of pieces of distance data notified from the plurality of distance detection apparatuses 11 are configured with three-dimensional coordinates based on different local reference positions. The data processing apparatus 12 corrects the three-dimensional coordinates corresponding to the position of the object B indicated by the distance data notified from each of the plurality of distance detection apparatuses 11 on the basis of a relationship among the positions of the plurality of distance detection apparatuses 11. The data processing apparatus 12 identifies the position of the object in the three-dimensional space by correcting the three-dimensional coordinates indicating the position of the object B notified from each of the plurality of distance detection apparatuses 11 and calculating three-dimensional coordinates indicating the position of the object B, with a reference position (hereinafter referred to as a global reference position) in the three-dimensional space where the plurality of distance detection apparatuses 11 exist as the origin. The global reference position in the three-dimensional space may be any position, but it is required that (i) the orientations of the plurality of distance detection apparatuses 11 with respect to the global reference position and (ii) distances between the global reference position and the plurality of distance detection apparatuses 11 (that is, a positional relationship between the reference position and each of the plurality of distance detection apparatuses 11) are known and the data processing apparatus 12 stores said orientations and distances.

The data processing apparatus 12 may generate one set of integrated distance data in one three-dimensional space including a plurality of distance detection ranges corresponding to the plurality of distance detection apparatuses 11 by integrating the plurality of pieces of distance data using the positional relationship between the global reference position and each of the plurality of distance detection apparatuses 11. In this case, the data processing apparatus 12 analyzes the generated integrated distance data to identify the position of the object B included in the three-dimensional space.

Figure 2:
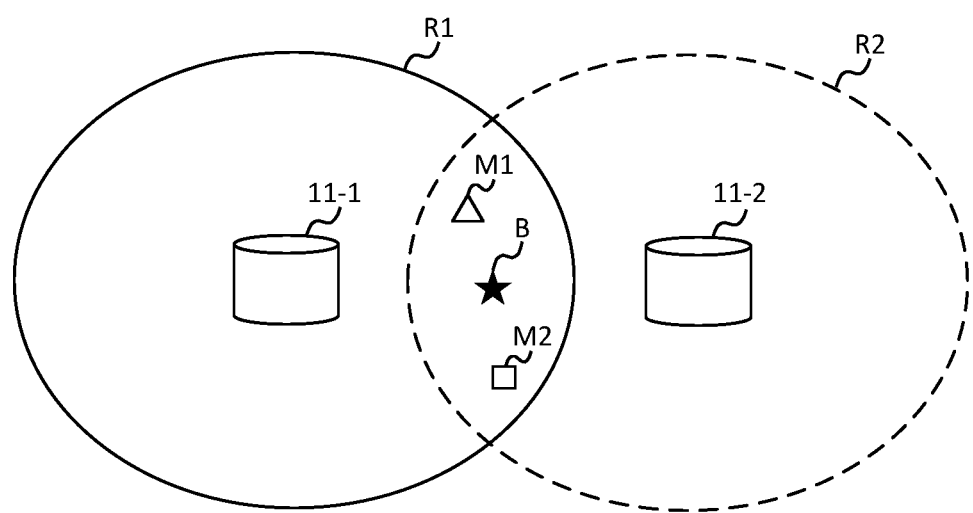
FIG. 2 illustrates a method of generating integrated distance data.

The data processing apparatus 12 may generate integrated distance data using a position of an object commonly included in the plurality of pieces of distance data notified from the plurality of distance detection apparatuses 11. FIG. 2 illustrates a method in which the data processing apparatus 12 generates the integrated distance data using the position of the object commonly included in the plurality of pieces of distance data. In the region R1 and the region R2 shown in FIG. 2, an object M1 and an object M2 are commonly included. Therefore, the plurality of pieces of distance data generated by the distance detection apparatus 11-1 and the distance detection apparatus 11-2 include the object M1 and the object M2.

The data processing apparatus 12 generates integrated distance data by superposing the distance data generated by the distance detection apparatus 11-1 and the distance data generated by the distance detection apparatus 11-2 so that a position of the object M1 and a position of the object M2 in the distance data generated by the distance detection apparatus 11-1 match a position of the object M1 and a position of the object M2 in the distance data generated by the distance detection apparatus 11-2. Since the data processing apparatus 12 operates in this manner, the data processing apparatus 12 can generate the integrated distance data even when the positional relationship between the plurality of distance detection apparatuses 11 is not known or even when the plurality of distance detection apparatuses 11 are moving.

[Configuration of the Position Detection System 1]

Figure 3:
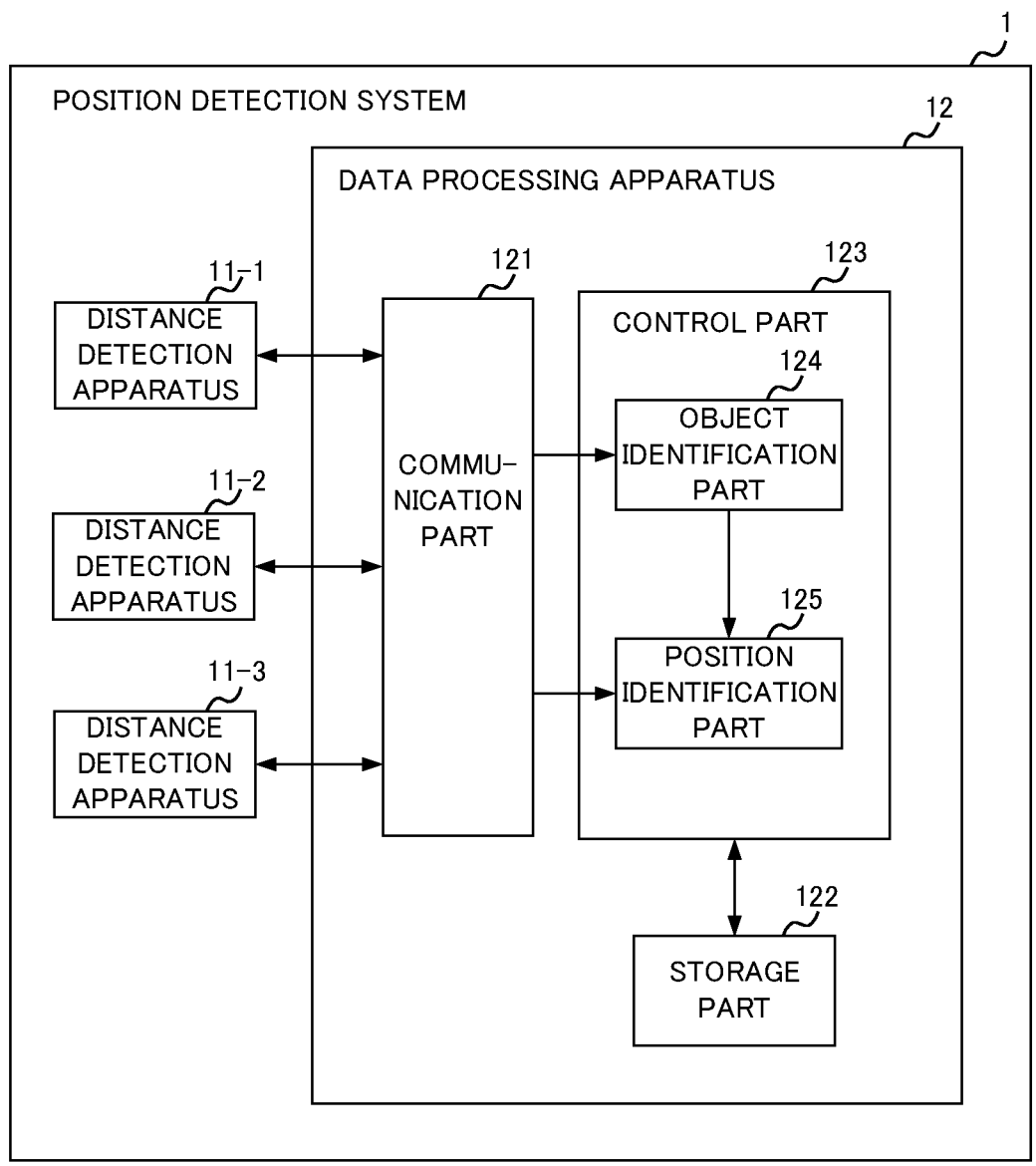
FIG. 3 shows a configuration of the position detection system 1.

FIG. 3 shows a configuration of the position detection system 1. In an example shown in FIG. 3, the data processing apparatus 12 includes a communication part 121, a storage part 122, and a control part 123. The control part 123 includes an object identification part 124 and a position identification part 125.

The communication part 121 has a communication interface for transmitting and receiving data to and from the plurality of distance detection apparatuses 11. The communication part 121 includes a wireless communication controller or a wired communication controller, for example. The communication part 121 transmits control data for controlling the plurality of distance detection apparatuses 11, and receives the distance data transmitted by the plurality of distance detection apparatuses 11. The communication part 121 stores the received distance data in the storage part 122. The communication part 121 may input the received distance data to the control part 123 and the object identification part 124.

The storage part 122 includes storage media such as a read only memory (ROM), a random access memory (RAM), a solid state drive (SSD), and the like. The storage part 122 stores a program executed by the control part 123. Further, the storage part 122 stores the distance data transmitted by each of the plurality of distance detection apparatuses 11 in association with identification information for identifying each of the plurality of distance detection apparatuses 11. The storage part 122 may store three-dimensional coordinate data indicating the positions of the plurality of distance detection apparatuses 11 in the three-dimensional space. Further, the storage part 122 may store geometry data indicating a three-dimensional geometry of an object to be identified by the control part 123.

The control part 123 includes a central processing unit (CPU). The control part 123 functions as the object identification part 124 and the position identification part 125 by executing the program stored in the storage part 122, for example.

The object identification part 124 identifies an object included in one or more pieces of distance data among the plurality of pieces of distance data generated by the plurality of distance detection apparatuses 11. For example, by detecting, in the distance data, a region corresponding to the geometry data stored in the storage part 122, the object identification part 124 identifies an object having a geometry indicated by the geometry data. The region corresponding to the geometry data is a region including a point cloud including a positional relationship that is the same as a positional relationship of the plurality of feature points included in the geometry data, for example. The object identification part 124 may determine that the object having the geometry indicated by the geometry data is included in the distance data when the positional relationship of some of the feature points of the geometry data matches the positional relationship of some of the point clouds included in the distance data.

The object identification part 124 notifies the position identification part 125 of the three-dimensional coordinates indicating the position where the object is identified in the distance data. For example, the object identification part 124 notifies the position identification part 125 about three-dimensional coordinates indicating a position, in the distance data, of a feature point of an object defined in the geometry data.

The position identification part 125 identifies the position of the object in the three-dimensional space in which the object exists on the basis of (i) the position in the three-dimensional space of the distance detection apparatus 11 that generated the distance data with which the object identification part 124 identified the object and (ii) the position of the object in the distance data. For example, when an object is identified in the distance data generated by the distance detection apparatus 11-1, the position identification part 125 calculates the three-dimensional coordinates of the object in the three-dimensional space by correcting the position of the object identified by the object identification part 124 using a difference value ($\Delta x$, $\Delta y$, $\Delta z$) between the global reference position and the position of the distance detection apparatus 11-1 in the three-dimensional space.

Specifically, the position identification part 125 calculates a plurality of three-dimensional coordinates indicating positions of a plurality of feature points of the object in the three-dimensional space by adding the difference value ($\Delta x$, Δy, Δz) between the global reference position and the position of the distance detection apparatus 11-1 in the three-dimensional space, in which the position detecting system 1 identifies the position of the object, to each of the plurality of three-dimensional coordinates (x1, y1, z1) indicating the positions of the plurality of feature points of the object in the distance data generated by the distance detection apparatus 11-1 notified from the object identification part 124. The position identification part 125 stores the calculated three-dimensional coordinates in the storage part 122. The position identification part 125 may transmit the calculated three-dimensional coordinates to an external device or display the three-dimensional coordinates on a display via the communication part 121.

The position identification method described above can be applied to various applications where identifying a position of an object in a three-dimensional space is required. Hereinafter, an embodiment in which a position identification method is applied to a three-dimensional geometry measurement system for measuring a three-dimensional geometry of an object, and an embodiment in which a position identification method is applied to a driving support system for making a plurality of vehicles self-drive themselves will be described.

[Configuration of a Three-Dimensional Geometry Measurement System 100]

Figure 4:
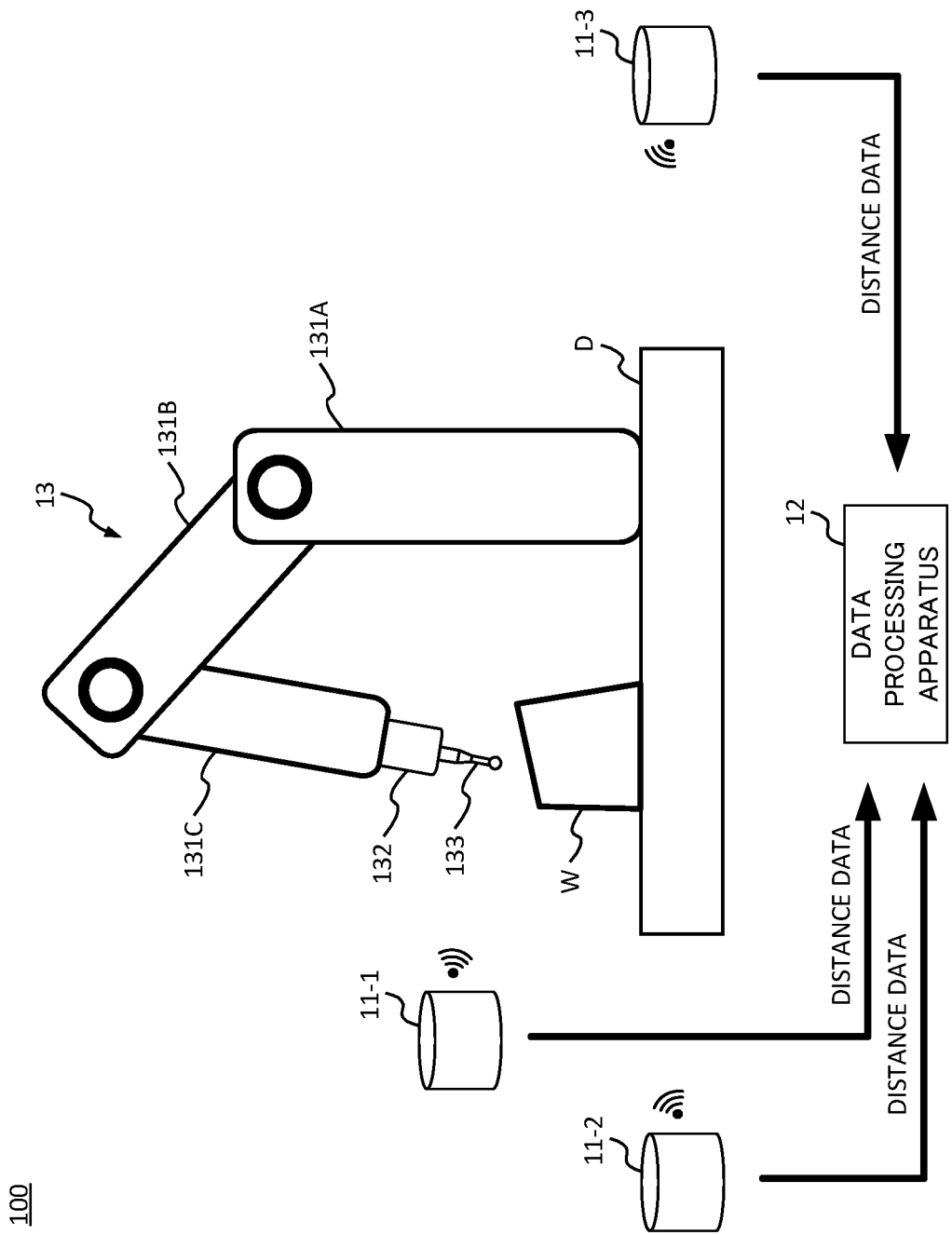
FIG. 4 shows a configuration of a three-dimensional geometry measurement system 100 using a position identification method according to the present embodiment.

FIG. 4 shows a configuration of a three-dimensional geometry measurement system 100 using the position identification method according to the present embodiment. The three-dimensional geometry measurement system 100 includes the plurality of distance detection apparatuses 11 shown in FIG. 1, a data processing apparatus 12A, and an object search apparatus 13. The data processing apparatus 12A has a function equivalent to that of the data processing apparatus 12 shown in FIG. 3, but is different from the data processing apparatus 12 in that the data processing apparatus 12A further has a function of measuring a three-dimensional geometry of an object to be measured W (hereinafter, referred to as a workpiece W).

The object search apparatus 13 includes an arm 131, a probe 132, and a stylus 133. The arm 131 includes an arm 131A, an arm 131B, and an arm 131C, and the arm 131A is fixed to a platform D.

The arm 131 has a plurality of joints, and the probe 132 is coupled to the tip of the arm 131C. The stylus 133 that contacts a plurality of positions on the workpiece W whose geometry is to be measured is coupled to the probe 132. The object search apparatus 13 changes a position of the arm 131 on the basis of control data input from the data processing apparatus 12. The object search apparatus 13 can move the stylus 133 to any position in the three-dimensional space in which the three-dimensional geometry measurement system 100 can measure the geometry of the workpiece W and cause the stylus 133 contact the workpiece W.

In the three-dimensional geometry measurement system 100, at least one of the probe 132 and the stylus 133 is an object whose position is to be detected by the data processing apparatus 12. The plurality of distance detection apparatuses 11 generate distance data by emitting a laser beam into a region in which the probe 132 can move around while the object search apparatus 13 is repeating an operation of bringing the stylus 133 into contact with a plurality of positions on the workpiece W while moving the probe 132. While the probe 132, which is the object whose position is to be detected, is moving, each of the plurality of distance detection apparatuses 11 generates a plurality of pieces of time-by-time distance data which are distance data associated with a plurality of timings. The plurality of distance detection apparatuses 11 notify the generated time-by-time distance data to the data processing apparatus 12 in association with the time.

Figure 5:
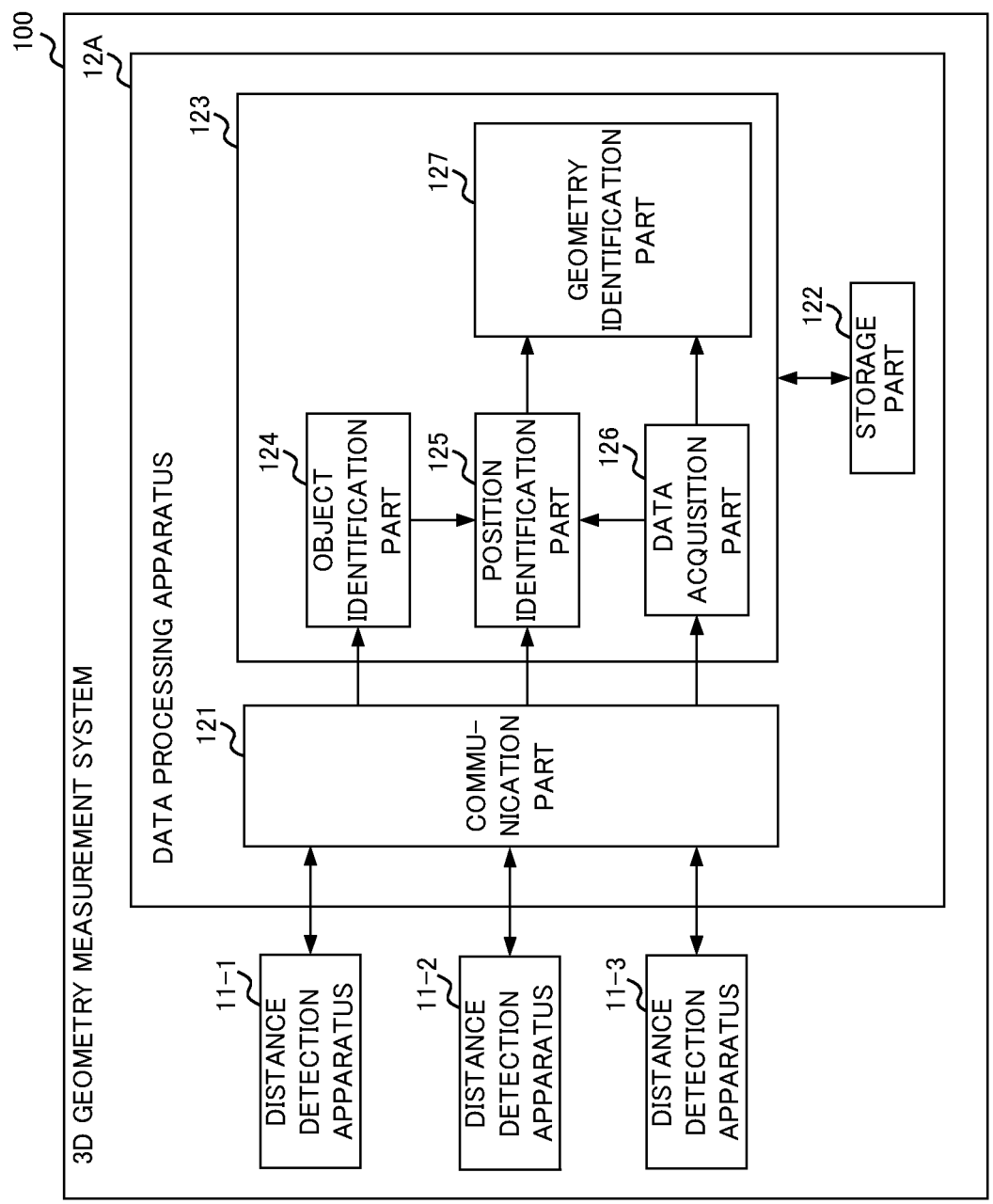
FIG. 5 shows a functional configuration of the three-dimensional geometry measurement system 100.

FIG. 5 shows a functional configuration of the three-dimensional geometry measurement system 100. In a similar manner as the example shown in FIG. 3, the data processing apparatus 12 includes the communication part 121, the storage part 122, and the control part 123. The control part 123 in the three-dimensional geometry measurement system 100 shown in FIG. 5 further includes a data acquisition part 126 and a geometry identification part 127 in addition to the object identification part 124 and the position identification part 125 shown in FIG. 3.

The storage part 122 of the three-dimensional geometry measurement system 100 stores geometry data indicating the geometry of the probe 132 coupled to the stylus 133. The storage part 122 may store the geometry data of the probe 132 and offset data indicating a relationship between a position of the probe 132 and a position of the stylus 133. The position of the probe 132 is a position of a feature point of the probe 132, and is a position where the stylus 133 is coupled in the probe 132, a position of a vertex of the probe 132, or a position of a marker provided on the probe 132, for example.

The offset data indicating the relationship between the position of the probe 132 and the position of the stylus 133 is data indicating an offset position of the tip of the stylus 133 with respect to the position of one or more feature points of the probe 132. The offset position is expressed by a direction of a line connecting the feature point of the probe 132 and the tip of the stylus 133 with respect to a predetermined direction (for example, the longitudinal direction) of the probe 132, and a distance from the feature point to the tip of the stylus 133, for example. The storage part 122 may store (i) geometry data of the stylus 133 or (ii) geometry data of the probe 132 and the stylus 133 in a coupled state.

The object identification part 124 identifies the probe 132 in the distance data by searching for a region with a geometry that matches the geometry data of the probe 132 in the distance data. The object identification part 124 identifies the probe 132 in one or more pieces of time-by-time distance data among the plurality of pieces of time-by-time distance data generated by the plurality of distance detection apparatuses 11 at the same time. The object identification part 124 identifies the probe 132 by matching data indicating a geometry identified by a point cloud included in the time-by-time distance data and geometry data indicating the three-dimensional geometry of the probe 132 stored in the storage part 122, for example. The data indicating the geometry identified by the point cloud is data indicating an outline of an aggregate of a plurality of points within a predetermined distance, for example.

The object identification part 124 identifies the three-dimensional coordinates indicating the position of the probe 132 in the distance data. The object identification part 124 identifies the position of the probe 132 on the basis of the plurality of pieces of time-by-time distance data generated by the plurality of distance detection apparatuses 11. For example, the object identification part 124 identifies the probe 132 in the time-by-time distance data generated by the distance detection apparatus 11 in which the workpiece W does not exist between the distance detection apparatus 11 and the probe 132.

It should be noted that the object identification part 124 may identify the probe 132 on the basis of the distance data generated at a point in time when the stylus 133 contacts the workpiece W, and not identify the probe 132 on the basis of other distance data. The object identification part 124 determines whether or not to identify the probe 132 on the basis of a result of determining whether or not the stylus 133 contacts the workpiece W on the basis of contact data acquired by the data acquisition part 126 described later, for example.

The object identification part 124 notifies the position identification part 125 of the identified three-dimensional coordinates. The three-dimensional coordinates are three-dimensional coordinates based on the local reference position of the distance detection apparatus 11, and are different for each piece of time-by-time distance data generated by the plurality of distance detection apparatuses 11.

The position identification part 125 identifies positions of the probe 132 corresponding to the respective plurality of timings in the three-dimensional space in which the three-dimensional geometry measurement system 100 can measure the geometry of the workpiece W on the basis of (i) the position in the space of the distance detection apparatus 11 that generated the time-by-time distance data with which the object identification part 124 identified the probe 132 and (ii) the position of the probe 132 in the time-by-time distance data. The three-dimensional space in which the three-dimensional geometry measurement system 100 can measure the geometry of the workpiece W is a space including a range in which the tip of the stylus 133 can move along with movement of the arm 131.

The position identification part 125 identifies a position of the tip of the stylus 133 in the space by identifying the position of the tip of the stylus 133 in the distance data on the basis of (i) the position of the probe 132 in the distance data and (ii) a relationship between the position of the probe 132 and the position of the stylus 133 indicated by the geometry data. Since the position identification part 125 identifies the position of the tip of the stylus 133 on the basis of the position of the probe 132 and the relative positional relationship between the probe 132 and the stylus 133, the position identification part 125 can identify the position of the tip of the stylus 133 even when the distance data does not include the tip of the stylus 133 because the stylus 133 is in the recessed part of the workpiece W, for example.

Further, the position identification part 125 calculates the three-dimensional coordinates indicating the position of the tip of the stylus 133 in the three-dimensional space by adding or subtracting the difference value ($\Delta x$, $\Delta y$, $\Delta z$) indicating the relative position of the distance detection apparatus 11 with respect to the global reference position in the three-dimensional space to or from three-dimensional coordinates indicating the position of the tip of the stylus 133 in the time-by-time distance data. The global reference position of the three-dimensional space may be any position, and it is a position where a rotation axis of the arm 131A intersects the platform D, for example. The position identification part 125 notifies the geometry identification part 127 of the three-dimensional coordinates of the position of the tip of the stylus 133 calculated in this manner. For example, the position identification part 125 notifies the geometry identification part 127 of the three-dimensional coordinates in association with the timing at which the time-by-time distance data is generated.

The position identification part 125 identifies the position of the probe 132 on the basis of the plurality of pieces of time-by-time distance data generated by the plurality of distance detection apparatuses 11. For example, the position identification part 125 identifies three-dimensional coordinates of the position of the tip of the stylus 133 on the basis of a position of the probe 132 identified by the object identification part 124 in the time-by-time distance data generated by the distance detection apparatus 11 in which the workpiece W does not exist between the distance detection apparatus 11 and the probe 132.

Since the position identification part 125 uses the plurality of pieces of time-by-time distance data generated by the plurality of distance detection apparatuses 11, even when the probe 132 is not included in the time-by-time distance data generated by some of the distance detection apparatuses 11, the position identification part 125 can identify the position of the probe 132 in the three-dimensional space using the time-by-time distance data generated by other distance detection apparatuses 11. Therefore, the three-dimensional geometry measurement system 100 can identify the geometry of the whole workpiece W, since the position identification part 125 can identify the position of the probe 132 even when the workpiece W, which may be the obstacle, exists in front of the stylus 133.

Figure 6A:
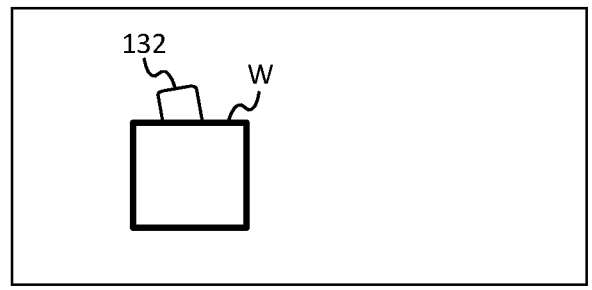
FIGS. 6A to 6C each schematically show a plurality of pieces of time-by-time distance data generated by a plurality of distance detection apparatuses 11 at the same time.
Figure 6B:
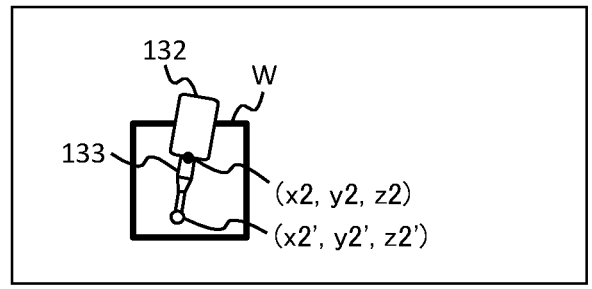
Figure 6C:
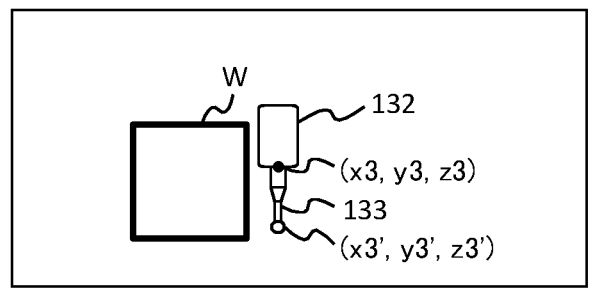

FIGS. 6A to 6C are each a diagram schematically showing the plurality of pieces of time-by-time distance data generated by the plurality of distance detection apparatuses 11 at the same timing. FIG. 6A shows time-by-time distance data generated by the distance detection apparatus 11-1. FIG. 6B shows time-by-time distance data generated by the distance detection apparatus 11-2. FIG. 6C shows time-by-time distance data generated by the distance detection apparatus 11-3.

In the time-by-time distance data shown in FIG. 6A, since the workpiece W exists between the distance detection apparatus 11-1 and the probe 132, the position identification part 125 cannot identify the position of the stylus 133 using the time-by-time distance data generated by the distance detection apparatus 11-1. However, in the time-by-time distance data shown in FIG. 6B, since the probe 132 is positioned between the distance detection apparatus 11-2 and the workpiece W, the position identification part 125 can calculate three-dimensional coordinates (x2', y2', z2') of the position of the tip of the stylus 133 using three-dimensional coordinates (x2, y2, z2) indicating the position of the probe 132 in the time-by-time distance data generated by the distance detection apparatus 11-2.

Also, in an example shown in FIG. 6C, since the workpiece W does not exist on a straight line connecting the distance detection apparatus 11-3 and the probe 132, the position identification part 125 can calculate three-dimensional coordinates (x3', y3', z3') of the position of the tip of the stylus 133 using three-dimensional coordinates (x3, y3, x3) indicating the position of the probe 132 in the time-by-time distance data generated by the distance detection apparatus 11-3. As described above, since the three-dimensional geometry measurement system 100 includes the plurality of distance detection apparatuses 11, the position identification part 125 can identify the position of the probe 132 on the basis of the time-by-time distance data generated by any one of the plurality of distance detection apparatuses 11, regardless of the position of the probe 132.

When there is no disturbance, the three-dimensional coordinates indicating the positions of the stylus 133 identified by the position identification part 125 on the basis of the respective plurality of pieces of time-by-time distance data are supposed to match. On the other hand, when the positions of the stylus 133 corresponding to the plurality of pieces of time-by-time distance data do not match, it is considered that the position of the probe 132 is erroneously detected due to the influence of disturbance. Therefore, the position identification part 125 may identify the position of the probe 132 on condition that the positions of the stylus 133 in the spaces corresponding to the plurality of pieces of time-by-time distance data generated by the plurality of distance detection apparatuses 11 corresponding to the same timing match.

When a plurality of three-dimensional coordinates of the probe 132 identified by the position identification part 125 on the basis of the plurality of pieces of time-by-time distance data do not match, the position identification part 125 does not notify the geometry identification part 127 of such three-dimensional coordinates because it is considered that the influence of disturbance has occurred. Since the position identification part 125 does not notify the geometry identification part 127 of such three-dimensional coordinates, the geometry of the workpiece W is not identified on the basis of data that is not suitable for identifying the geometry of the workpiece W. Therefore, the accuracy of the three-dimensional geometry measurement is improved.

Further, the position identification part 125 may identify the position of the probe 132 on condition that a relationship of a plurality of orientations of the probe 132 corresponding to the plurality of pieces of geometry data which the object identification part 124 used for identifying the probe 132 by using the plurality of pieces of distance data generated by the plurality of distance detection apparatuses 11 matches a relationship of a plurality of orientations of the plurality of distance detection apparatuses 11. If an object, such as the probe 132, with which the position identification part 125 identifies a position is not a sphere, the object can be seen in different geometries depending on the position where the object is viewed. That is, the geometries of the plurality of objects included in the plurality of pieces of distance data generated by the plurality of distance detection apparatuses 11 at different positions are different from each other, and the relationship between the plurality of orientations of the object identified by the object identification part 124 in the plurality of pieces of distance data is supposed to match the relationship between the plurality of orientations of the plurality of distance detection apparatuses 11.

However, in a case where the relationship of the orientations of the objects identified by the object identification part 124 in the plurality of pieces of distance data do not match the relationship of the orientations of the plurality of distance detection apparatuses 11, it is considered that the object identification part 124 has erroneously detected the object. Therefore, by having the position identification part 125 not use the position of the probe 132 identified by the object identification part 124 in such a case, it is possible to prevent the position identification part 125 from erroneously identifying the position of the tip of the stylus 133. Therefore, measurement accuracy is improved.

It should be noted that the position identification part 125 may identify the position of the tip of the stylus 133 on the basis of the distance data generated at a point in time when the stylus 133 contacts the workpiece W, and not identify the position of the tip of the stylus 133 on the basis of other distance data. For example, the position identification part 125 determines whether or not to identify the position of the tip of the stylus 133 on the basis of a result of determining whether or not the stylus 133 contacts the workpiece W on the basis of contact data acquired by the data acquisition part 126 described later. The position identification part 125 may identify the position of the tip of the stylus 133 on condition that the position of the probe 132 identified by the object identification part 124 has not changed for a predetermined time or more (for example, a stationary state).

In the above description, the case where the object identification part 124 identifies the probe 132 on the basis of the distance data, and the position identification part 125 identifies the position of the stylus 133 on the basis of a relationship between the position of the probe 132 and the position of the tip of the stylus 133 was illustrated as an example. Since the object identification part 124 and the position identification part 125 operate in this manner, even in a case where it is difficult for the object identification part 124 to identify a thin, small-sized stylus 133 on the basis of the distance data, the position identification part 125 can identify the position of the tip of the stylus 133 on the basis of a result of identifying the probe 132 by the object identification part 124. However, when the object identification part 124 identifies the stylus 133 in the distance data, the position identification part 125 may identify the position of the tip of the stylus 133 without identifying the position of the probe 132.

The data acquisition part 126 acquires contact data indicating that the stylus 133 is in contact with the workpiece W. The data acquisition part 126 notifies the geometry identification part 127 of the acquired contact data. The data acquisition part 126 may acquire the contact data directly from the distance detection apparatus 11. The contact data may be included in the distance data, and the data acquisition part 126 may acquire the contact data included in the distance data.

The geometry identification part 127 outputs three-dimensional geometry data indicating a plurality of positions on the workpiece W separated by a difference between the position of the probe 132 and the position of the workpiece W from the plurality of positions of the probe 132 identified by the position identification part 125. When the stylus 133 is coupled to the probe 132, the geometry identification part 127 outputs three-dimensional geometry data indicating a plurality of positions, where the stylus 133 contacted the workpiece W, at which the relationship between the position of the probe 132 and the position of the tip of the stylus 133 is identified on the basis of the relationship between the position of the probe 132 and the position of the workpiece W. The geometry identification part 127 outputs the three-dimensional geometry data indicating the positions where the stylus 133 contacted the workpiece W, which are identified on the basis of the position of the tip of the stylus 133 notified from the position identification part 125.

When the probe 132 can output the contact data indicating that the stylus 133 has contacted the workpiece W and the data acquisition part 126 acquires said contact data, the geometry identification part 127 outputs three-dimensional geometry data indicating a plurality of positions on the workpiece W corresponding to a plurality of positions of the probe 132 identified by the position identification part 125 while the contact data indicates that the stylus 133 is in contact with the workpiece W. Since the geometry identification part 127 operates in this manner, the geometry identification part 127 can appropriately identify the geometry of the workpiece W without using the position of the stylus 133 identified on the basis of the position of the probe 132 at a point in time when the stylus 133 is not in contact with the workpiece W.

The geometry identification part 127 may output three-dimensional geometry data indicating a plurality of positions on the workpiece W corresponding to a plurality of positions of the probe 132 identified by the position identification part 125 in a state where the position of the probe 132 identified by the position identification part 125 has not changed for a predetermined time or more. Since the geometry identification part 127 operates in this manner, the geometry identification part 127 can appropriately identify the geometry of the workpiece W on the basis of the position of the probe 132 at a point in time when the stylus 133 contacts the workpiece W even when the probe 132 cannot output the contact data indicating that the stylus 133 has contacted the workpiece W.

The stylus 133 does not need to be coupled to the probe 132 if the probe 132 is a non-contact type probe, such as a white interferometer probe, that detects the workpiece W at a position in a predetermined relationship with the position of the probe 132. In such a case, the position identification part 125 does not identify the position of the tip of the stylus 133. In this case, the geometry identification part 127 may output the three-dimensional geometry data indicating the plurality of positions on the workpiece W by correcting the position of the probe 132 on the basis of a predetermined relationship. The predetermined relationship is expressed by a distance from the tip of the probe 132 to the surface of the workpiece W in a predetermined direction.

When the probe 132 outputs data indicating that the distance between the tip of the probe 132 and the surface of the workpiece W is 10 mm, the geometry identification part 127 identifies, as the position on the workpiece W, a position shifted by 10 mm in a predetermined direction (for example, the longitudinal direction of the probe 132) from the position of the probe 132 at a point in time when the data acquisition part 126 acquired the data (that is, the position of the surface of the workpiece W closest to the probe 132), for example. Since the geometry identification part 127 operates in this manner, the geometry identification part 127 can identify the geometry of the workpiece W on the basis of the position of the probe 132.

In the above description, the case where the three-dimensional geometry measurement system 100 has one object search apparatus 13 was illustrated as an example, but the three-dimensional geometry measurement system 100 may have a plurality of object search apparatuses 13. The plurality of object search apparatuses 13 have probes 132 having different shapes, and the object identification part 124 identifies the plurality of probes 132 included in the distance data. The position identification part 125 identifies positions of the plurality of probes 132, and the geometry identification part 127 outputs three-dimensional geometry data indicating a plurality of positions on the workpiece W corresponding to the positions of the plurality of probes 132.

Since the three-dimensional geometry measurement system 100 is configured in this manner, the plurality of object search apparatuses 13 can each bring a stylus 133 into contact with a plurality of different positions on the workpiece W by simultaneously moving the probes 132. Since the object identification part 124 can simultaneously identify the positions of the plurality of probes 132 or the positions of the plurality of styluses 133, the three-dimensional geometry measurement system 100 can reduce the time for measuring the geometry of the workpiece W.

In the above description, the position identification part 125 identifies the position of the probe 132 included in each piece of distance data without integrating the plurality of pieces of distance data, but the position identification part 125 may integrate the plurality of pieces of distance data to generate integrated distance data expressed by three-dimensional coordinates of the three-dimensional space coordinate system, and identify the position of the probe 132 in the integrated distance data. In this case, the position identification part 125 integrates the plurality of pieces of distance data using (i) the positional relationship of the plurality of distance detection apparatuses 11 or (ii) a position of a common element commonly included in the plurality of pieces of distance data generated by the plurality of distance detection apparatuses 11.

[Flow of Processing in the Three-Dimensional Geometry Measurement System 100]

Figure 7:
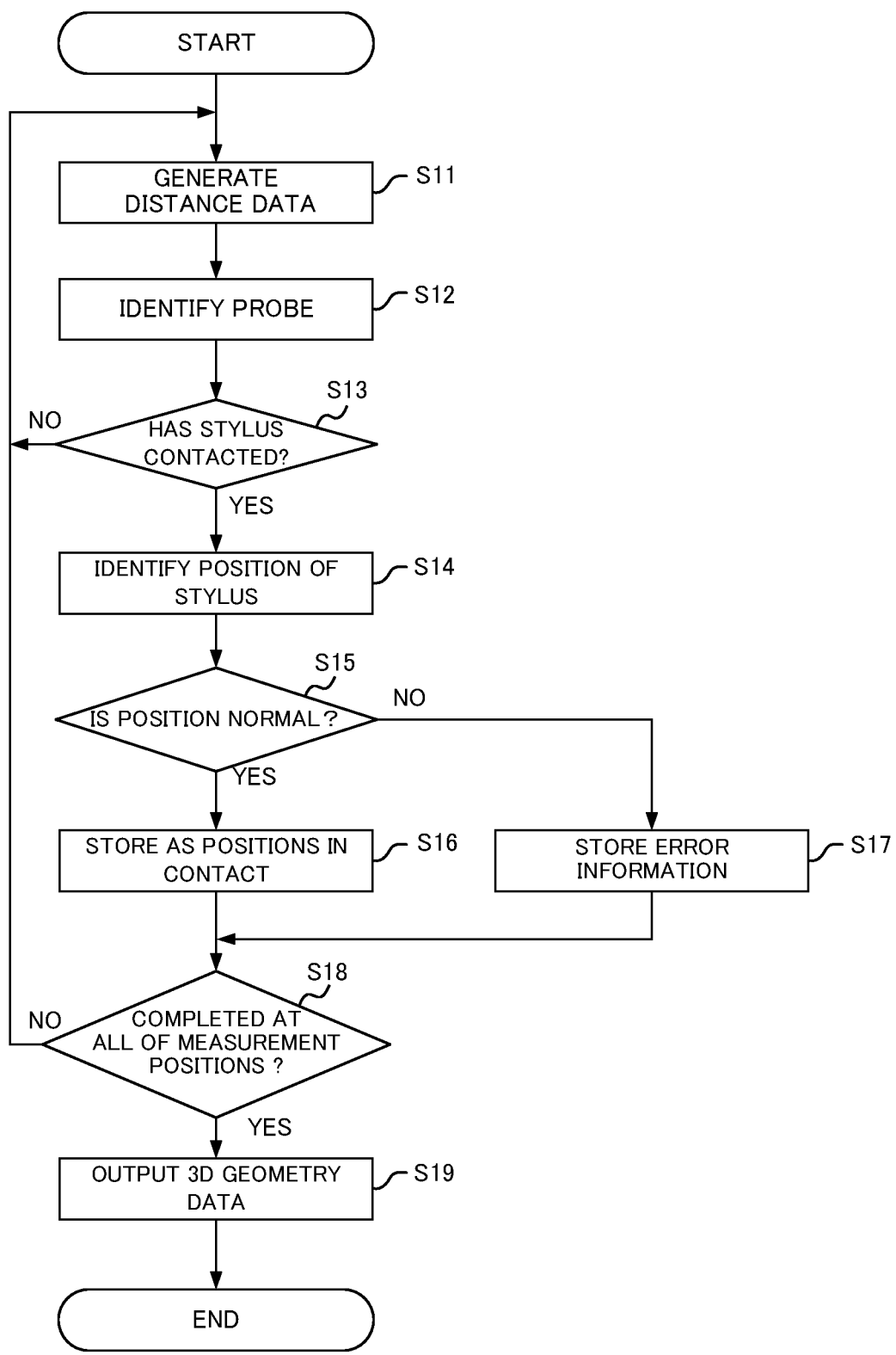
FIG. 7 is a flowchart showing an example of processing in the three-dimensional geometry measurement system 100.

FIG. 7 is a flowchart showing an example of processing in the three-dimensional geometry measurement system 100. The flowchart shown in FIG. 7 starts from a point in time when an operation for starting measurement of the geometry of the workpiece W is performed.

The plurality of distance detection apparatuses 11 each generate distance data by emitting a laser beam (S11). The object identification part 124 searches for the probe 132 in each of the plurality of pieces of distance data generated by the plurality of distance detection apparatuses 11, and identifies the probe 132 in the distance data including the probe 132 (S12). The position identification part 125 determines whether or not the stylus 133 coupled to the probe 132 contacts the workpiece W on the basis of the contact data acquired from the probe 132 via the geometry identification part 127 or on the basis of the movement speed of the probe 132 (S13).

When it is determined that the stylus 133 has contacted the workpiece W, the position identification part 125 identifies the position of the probe 132 in the three-dimensional coordinate system of the three-dimensional space, in which the workpiece W is placed, on the basis of (i) the position of the probe 132 identified by the object identification part 124 in the distance data and (ii) the relative position of the distance detection apparatus 11 with respect to the global reference position. The position identification part 125 identifies the position of the tip of the stylus 133 on the basis of (i) the identified position of the probe 132 and (ii) the relationship between the position of the probe 132 and the position of the tip of the stylus 133 (S14).

The position identification part 125 determines whether or not the identified position of the stylus 133 is normal (S15). The position identification part 125 determines whether or not positions of the stylus 133 identified on the basis of the positions of the probe 132 included in the plurality of pieces of distance data generated by the plurality of distance detection apparatuses 11 match, for example. When the plurality of positions of the stylus 133 corresponding to the plurality of pieces of distance data match, the position identification part 125 determines that the plurality of identified positions are normal (YES in S15), and stores the identified positions of the stylus 133 as the positions in contact with the workpiece W in the storage part 122 (S16). When the plurality of positions of the stylus 133 corresponding to the plurality of pieces of distance data do not match, the position identification part 125 determines that the plurality of identified positions are not normal (NO in S15), and stores error information in the storage part 122 (S17).

The position identification part 125 determines whether or not the probe 132 has moved to all of the positions that need to be measured and the measurement at all measurement positions has been completed (S18). For example, when the probe 132 has been detected at all of the positions in a preset region, the position identification part 125 determines that the measurement is completed (YES in S18), and notifies the geometry identification part 127 that the measurement is completed. When the position identification part 125 determines that the measurement has not been completed at all of the measurement positions (NO in S18), the three-dimensional geometry measurement system 100 repeats the above-described steps S11 to S18.

When the measurement at all of the measurement positions is completed, the geometry identification part 127 generates three-dimensional geometry data on the basis of the positions of the stylus 133 stored in the storage part 122, and outputs the generated three-dimensional geometry data (S19).

[Calibration of the Three-Dimensional Geometry Measurement System 100]

In the above description, it is assumed that the relative positions of the plurality of distance detection apparatuses 11 with respect to the global reference position of the three-dimensional space (that is, the positional relationship between the plurality of distance detection apparatuses 11) are known. However, when the position of the distance detection apparatus 11 changes, the relative positions of the plurality of distance detection apparatuses 11 with respect to the global reference position in the three-dimensional space change, and measurement errors may occur.

Therefore, the three-dimensional geometry measurement system 100 may execute calibration for measuring the relative positions of the plurality of distance detection apparatuses 11 before starting measurement of the geometry of the workpiece W. Specifically, when an operation of executing calibration is performed, the plurality of distance detection apparatuses 11 emit a laser beam toward the reference object in a state where the reference object having a feature point in a range where the laser beam emitted by the plurality of distance detection apparatuses 11 reaches is fixed to the platform D. The object identification part 124 identifies three-dimensional coordinates of the reference object based on the local reference positions of the plurality of distance detection apparatuses 11 on the basis of the distance data generated by the plurality of distance detection apparatuses 11.

The position identification part 125 calculates a difference value of three-dimensional coordinates corresponding to each of the plurality of distance detection apparatuses 11 as a relative position, and stores the calculated result in the storage part 122. The position identification part 125 stores three-dimensional coordinates of the plurality of distance detection apparatuses 11 in which a position of the reference object is the global reference position (that is, the origin of the three-dimensional space), for example. After the calibration, by identifying the position of the workpiece W in the three-dimensional space, the position identification part 125 corrects the three-dimensional coordinates of the workpiece W identified by the object identification part 124 using the relative position stored in the storage part 122.

The three-dimensional geometry measurement system 100 may use, as the reference object, an object that always exists such as a position where the rotation axis of the arm 131A intersects the platform D. In this case, the three-dimensional geometry measurement system 100 can improve measurement accuracy efficiently because it can perform calibration without having someone who measures the geometry of the workpiece W place the reference object on the platform D.

[A Method of Identifying the Positional Relationship Between the Probe 132 and the Stylus 133]

It is assumed in the above description that the position of the stylus 133 with respect to the probe 132 is constant, but it can be considered that the position of the stylus 133 with respect to the probe 132 varies. Therefore, the three-dimensional geometry measurement system 100 may calibrate the position of the stylus 133 with respect to the probe 132 before measuring the geometry of the workpiece W.

As an example, the three-dimensional geometry measurement system 100 causes the plurality of distance detection apparatuses 11 to emit laser beams in a state where the probe 132 and the stylus 133 are in a range where the laser beams emitted by the plurality of distance detection apparatuses 11 reach. By correcting the three-dimensional coordinates calculated by the object identification part 124 on the basis of the distance data, the position identification part 125 calculates three-dimensional coordinates of the plurality of feature points of the probe 132 and the three-dimensional coordinates of the tip of the stylus 133. The position identification part 125 stores, in the storage part 122, data indicating the position of the tip of the stylus 133 with respect to the positions of the plurality of feature points of the probe 132.

If variability in the position of the stylus 133 with respect to the probe 132 is negligible, the position identification part 125 can use the offset data indicating the positional relationship between the probe 132 and the stylus 133 stored in advance in the storage part 122. However, it is also conceivable that there are a plurality of probes 132 and a plurality of styluses 133, and a combination of the probe 132 and the stylus 133 used for measurement changes.

Therefore, the three-dimensional geometry measurement system 100 may execute a process of identifying the positional relationship between the probe 132 and the stylus 133 before measurement of the geometry of the workpiece W starts. The plurality of probes 132 and the plurality of styluses 133 may be provided with marks for identifying a type of the probe 132 or the stylus 133, and the object identification part 124 may identify a combination of the probe 132 and the stylus 133 on the basis of the distance data or captured image data. In this case, the offset data indicating the positional relationship between the probe 132 and the stylus 133 is stored in the storage part 122 for each combination of the probe 132 and the stylus 133, and the position identification part 125 identifies the position of the tip of the stylus 133 on the basis of the position of the probe 132 using the offset data corresponding to the combination of the probe 132 and the stylus 133 identified by the object identification part 124.

It should be noted that the method of identifying the combination of the probe 132 and the stylus 133 is not limited to the above-described method. At least one of the probe 132 and the stylus 133 may have a wireless communication function and transmit information indicating a combination of the probe 132 and the stylus 133 to the data processing apparatus 12A. The position identification part 125 may acquire the information via the communication part 121 and identify the combination of the probe 132 and the stylus 133 on the basis of the acquired information. At least one of the probe 132 and the stylus 133 may transmit information indicating the combination of the probe 132 and the stylus 133 to the distance detection apparatus 11. In this case, the position identification part 125 acquires the information indicating the combination of the probe 132 and the stylus 133 from the distance detection apparatus 11 via the communication part 121.

As described above, since the position identification part 125 identifies the positional relationship between the probe 132 and the stylus 133, the position of the tip of the stylus 133 can be identified on the basis of the position of the probe 132 even when the positional relationship between the probe 132 and the stylus 133 is not known.

[Acquisition of Data from the Probe 132 and the Stylus 133]

The data processing apparatus 12A may acquire, from the object search apparatus 13, data on usage of at least one of the probe 132 and the stylus 133 via the communication part 121. The data on usage is data indicating the number of contact times or the contact timing with the workpiece W when the probe 132 is a contact probe, and is data indicating the number of times of radiation of light or a total time of radiation of light when the probe 132 is a non-contact type probe (for example, a laser sensor). The data processing apparatus 12A may store the data acquired in this manner in the storage part 122 in association with identification information for identifying the object search apparatus 13, or may transmit the data to an external device accessible by an administrator of the object search apparatus 13. Since the data processing apparatus 12A is configured in this manner, the administrator of the object search apparatus 13 can easily grasp the state of the object search apparatus 13.

When a difference between the geometry of the workpiece W estimated on the basis of the state of the probe 132 or the stylus 133 indicated by the data acquired in this manner and the geometry of the workpiece W identified on the basis of the distance data acquired from the distance detection apparatus 11 is equal to or greater than a threshold value, the geometry identification part 127 of the data processing apparatus 12A may determine that an abnormality has occurred and output warning information. With this configuration of the data processing apparatus 12A, the administrator can detect that there is an error in the measurement result and detect an abnormality in the object search apparatus 13 or the distance detection apparatus 11.

[Effect of the Three-Dimensional Geometry Measurement System 100]

As described above, in the three-dimensional geometry measurement system 100, the plurality of distance detection apparatuses 11 emit laser beams toward the probe 132, and the position identification part 125 identifies the position of the probe 132 in the three-dimensional space on the basis of the reflected light from the probe 132. Further, the position identification part 125 identifies the position of the surface of the workpiece W on the basis of the position of the probe 132 identified in any one of the plurality of pieces of distance data. The position identification part 125 identifies the position of the surface of the workpiece W by identifying the position of the tip of the stylus 133 on the basis of the position of the probe 132, for example.

By identifying the position of the probe 132 using the plurality of pieces of distance data, even when the probe 132 is located on the opposite side of one distance detection apparatus 11 with respect to the workpiece W and the distance data generated by the distance detection apparatus 11 does not include the probe 132, the position identification part 125 can identify the position of the probe 132 on the basis of the distance data generated by other distance detection apparatuses 11. As a result, since the position identification part 125 can completely identify the position of the surface of the workpiece W, the three-dimensional geometry measurement system 100 can measure the geometry of all sides of the workpiece W.

[Configuration of a Driving Support System 200]

Figure 8:
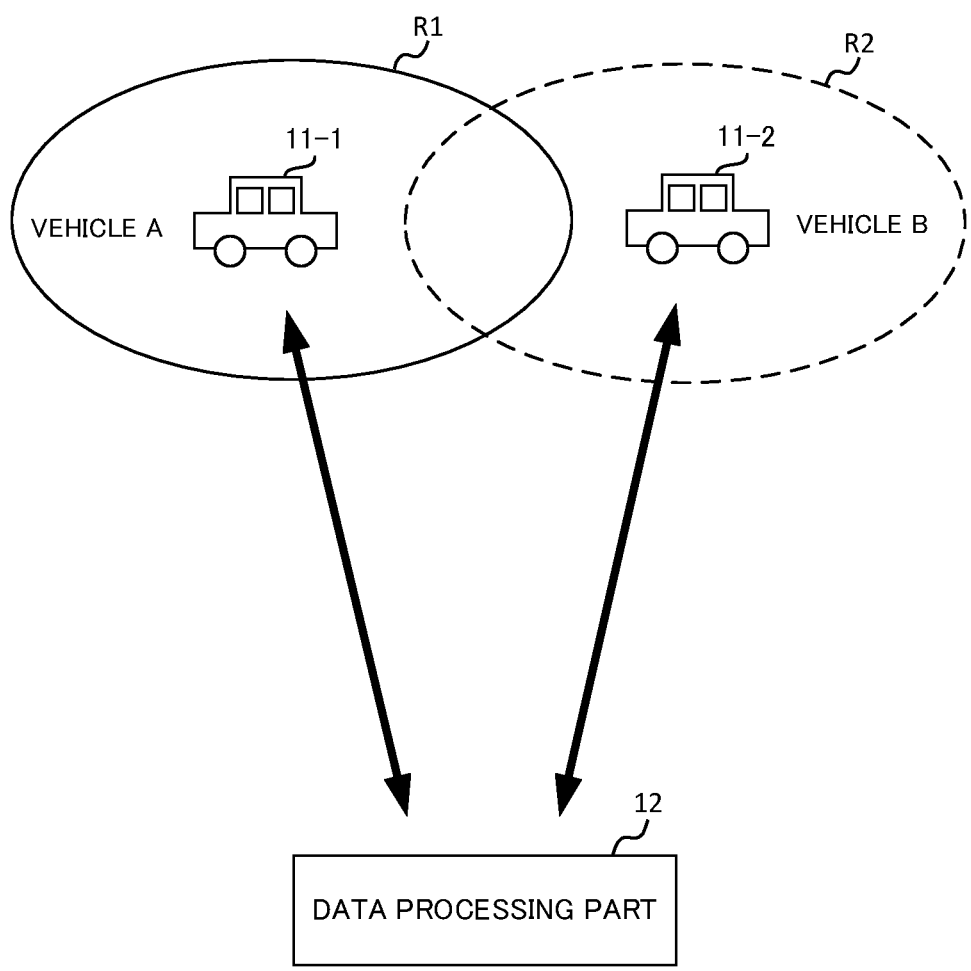
FIG. 8 shows an outline of a driving support system 200 using the position identification method according to the present embodiment.

FIG. 8 shows an outline of a driving support system 200 using the position identification method according to the present embodiment. The driving support system 200 is a system that identifies a position of an object around a vehicle on the basis of distance data generated by the plurality of distance detection apparatuses 11 mounted on a plurality of vehicles. The system is for supporting the driving of a vehicle and for making a vehicle self-drive on the basis of the identified position of the object.

The plurality of distance detection apparatuses 11 mounted on the plurality of vehicles (a vehicle A and a vehicle B) sequentially transmit the generated distance data to a data processing apparatus 12B. The driving support system 200 may identify the position of the object by further using distance data generated by a distance detection apparatus 11 installed on the road. Although only two vehicles are shown in FIG. 8, the driving support system 200 may include distance detection apparatuses 11 mounted on many more vehicles.

The data processing apparatus 12B identifies the position of the object using the position identification method described with reference to FIGS. 1 to 3, and provides data indicating the identified position to each vehicle. The data processing apparatus 12B has a function equivalent to that of the data processing apparatus 12 shown in FIG. 3, and is different from the data processing apparatus 12 in that the data processing apparatus 12B further has a function for supporting autonomous driving of the vehicle.

In the driving support system 200, instead of the data processing apparatus 12B identifying the position of the object, a data processing apparatus included in each vehicle may have the function of the data processing apparatus 12B. The data processing apparatus included in each vehicle acquires distance data from the plurality of distance detection apparatuses 11 mounted on other vehicles within a predetermined range from its own vehicle, and identifies an object around its own vehicle on the basis of the acquired distance data. Since the data processing apparatus 12B operates in this manner, each vehicle can identify a position of an object that exists at a position that cannot be directly viewed from its own vehicle, and therefore it is possible to notify a driver that there is an object that cannot be visually recognized directly, or can activate autonomous driving in consideration of the object that cannot be visually recognized directly.

Figure 9:
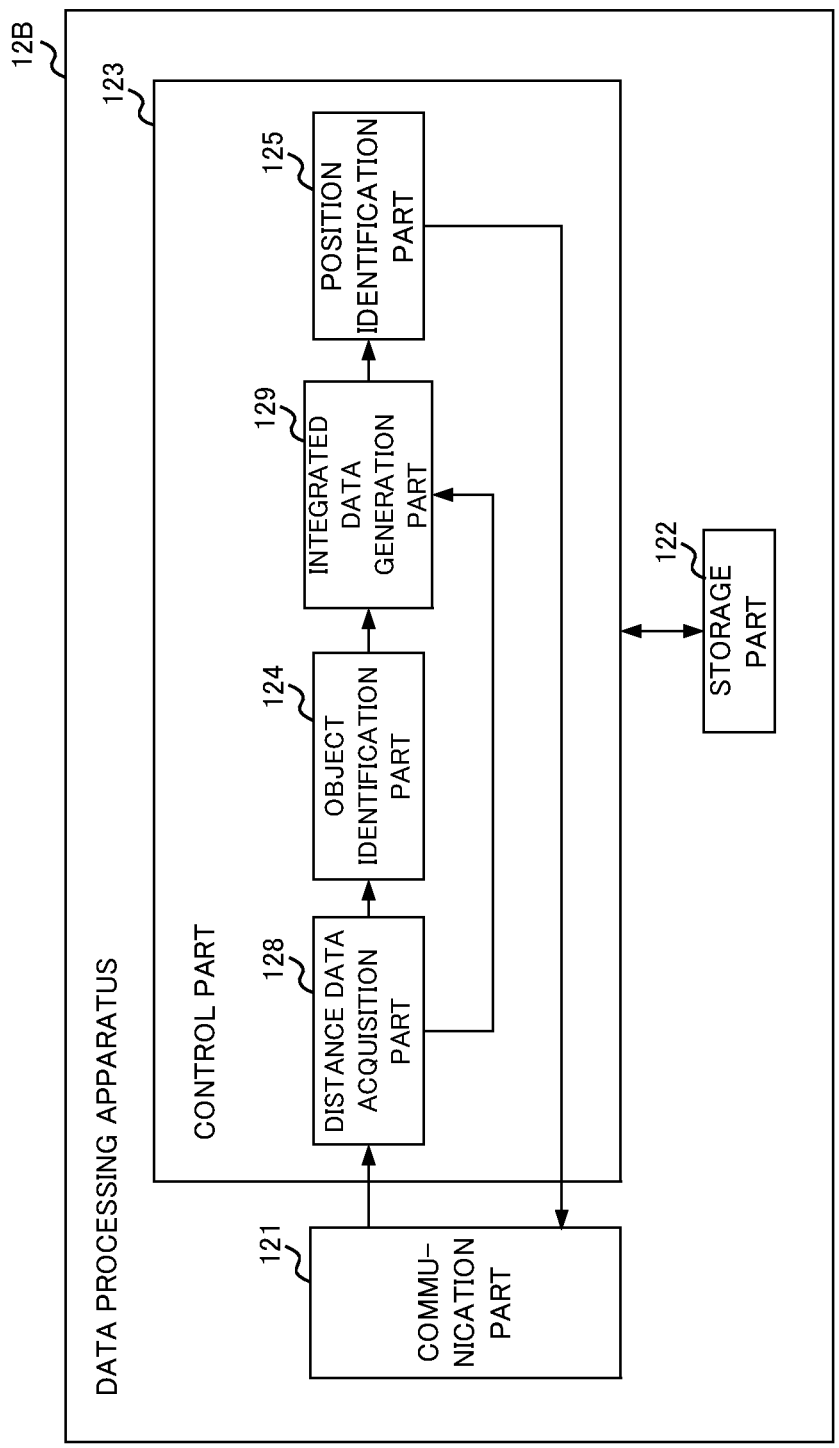
FIG. 9 shows a configuration of a data processing apparatus 12B in the driving support system 200.

FIG. 9 shows a configuration of the data processing apparatus 12B in the driving support system 200. In a similar manner as the data processing apparatus 12 shown in FIG. 3, the data processing apparatus 12B includes the communication part 121, the storage part 122, and the control part 123.

The control part 123 includes the object identification part 124, the position identification part 125, the distance data acquisition part 128, and an integrated data generation part 129. The object identification part 124 and the position identification part 125 have functions equivalent to those of the object identification part 124 and the position identification part 125 of the data processing apparatus 12 shown in FIG. 3. However, the position identification part 125 provides the object position data indicating the position of the identified object to a plurality of vehicles via the communication part 121.

The distance data acquisition part 128 acquires, via the communication part 121, a plurality of pieces of distance data generated by the plurality of distance detection apparatuses 11 that generate distance data indicating distances to a plurality of positions on the object by detecting light reflected by the object in a predetermined three-dimensional space. The distance data acquisition part 128 may acquire the plurality of pieces of distance data in association with vehicle identification information (e.g., a vehicle number) for identifying a vehicle. Further, the distance data acquisition part 128 acquires, from a plurality of moving distance detection apparatuses 11, position information indicating the positions of the plurality of distance detection apparatuses 11 in association with the plurality of pieces of distance data.

The distance data acquisition part 128 inputs the acquired plurality of pieces of distance data to the object identification part 124, and inputs the position information to the position identification part 125.

The distance detection apparatus 11 generates position information indicating the latitude and longitude of the distance detection apparatus 11 on the basis of radio waves which a global positioning system (GPS) receiver mounted on a vehicle received from GPS satellites, for example. The distance detection apparatus 11 may generate, after identifying its own position, position information indicating the latitude and longitude of the distance detection apparatus 11 on the basis of the speed of the vehicle measured by a speed sensor mounted on the vehicle and a traveling direction of the vehicle measured by a gyro sensor mounted on the vehicle. The distance data acquisition part 128 can identify a positional relationship of the plurality of distance detection apparatuses 11 by periodically acquiring the positional information from the plurality of distance detection apparatuses 11.

The object identification part 124 identifies an object that is included in one or more pieces of distance data among the plurality of pieces of distance data input from the distance data acquisition part 128. The object identified by the object identification part 124 is an object whose geometry data is stored in the storage part 122 in advance as an object assumed to exist in an area where the vehicle travels, and is an object such as a vehicle, a person, a bicycle, a motorcycle, a road sign, and a guardrail which the vehicle needs to recognize for autonomous driving. The object identification part 124 identifies a common object commonly included in the plurality of pieces of distance data generated by the plurality of distance detection apparatuses 11, and notifies the integrated data generation part 129 of a position of the identified common object in the distance data.

The integrated data generation part 129 generates integrated distance data corresponding to a three-dimensional space which is larger than the three-dimensional space corresponding to each of the plurality of pieces of distance data by arranging and integrating the plurality of pieces of distance data acquired by the distance data acquisition part 128 at the relative position corresponding to the positional relationship of the plurality of distance detection apparatuses 11 indicated by the position information input from the distance data acquisition part 128. The three-dimensional space corresponding to each of the plurality of pieces of distance data is a three-dimensional space in a range in which each of the plurality of distance detection apparatuses 11 can measure a distance. The integrated data generation part 129 generates the integrated distance data by the method described with reference to FIG. 2.

The integrated data generation part 129 generates the integrated distance data corresponding to the three-dimensional space larger than the three-dimensional space corresponding to each of the plurality of pieces of distance data by arranging and integrating the plurality of pieces of distance data such that positions of the common object near the plurality of vehicles overlap each other, for example. The integration data generation part 129 inputs the generated integrated distance data to the position identification part 125.

The position identification part 125 identifies the position of the object in the three-dimensional space on the basis of (i) the position in the three-dimensional space of the distance detection apparatus 11 that generated the distance data with which the object identification part 124 identified the object and (ii) the position of the object in the distance data. The position identification part 125 identifies the position of the object in a three-dimensional space including the plurality of vehicles by identifying the position of the object in the integrated distance data input from the integrated data generation part 129.

The position identification part 125 identifies the position of the object in the three-dimensional space on the basis of (i) the position in the space of the distance detection apparatus 11 indicated by the position information acquired by the distance data acquisition part 128 and (ii) the position of the object in the distance data. For example, the position identification part 125 may identify the position of the object by adding coordinates indicating the position of the object in the distance data to coordinates of the position of the distance detection apparatus 11 indicated by the position information. The position identification part 125 provides the object position data indicating the identified position of the object to each vehicle.

[Flow of Processing in the Driving Support System 200]

Figure 10:
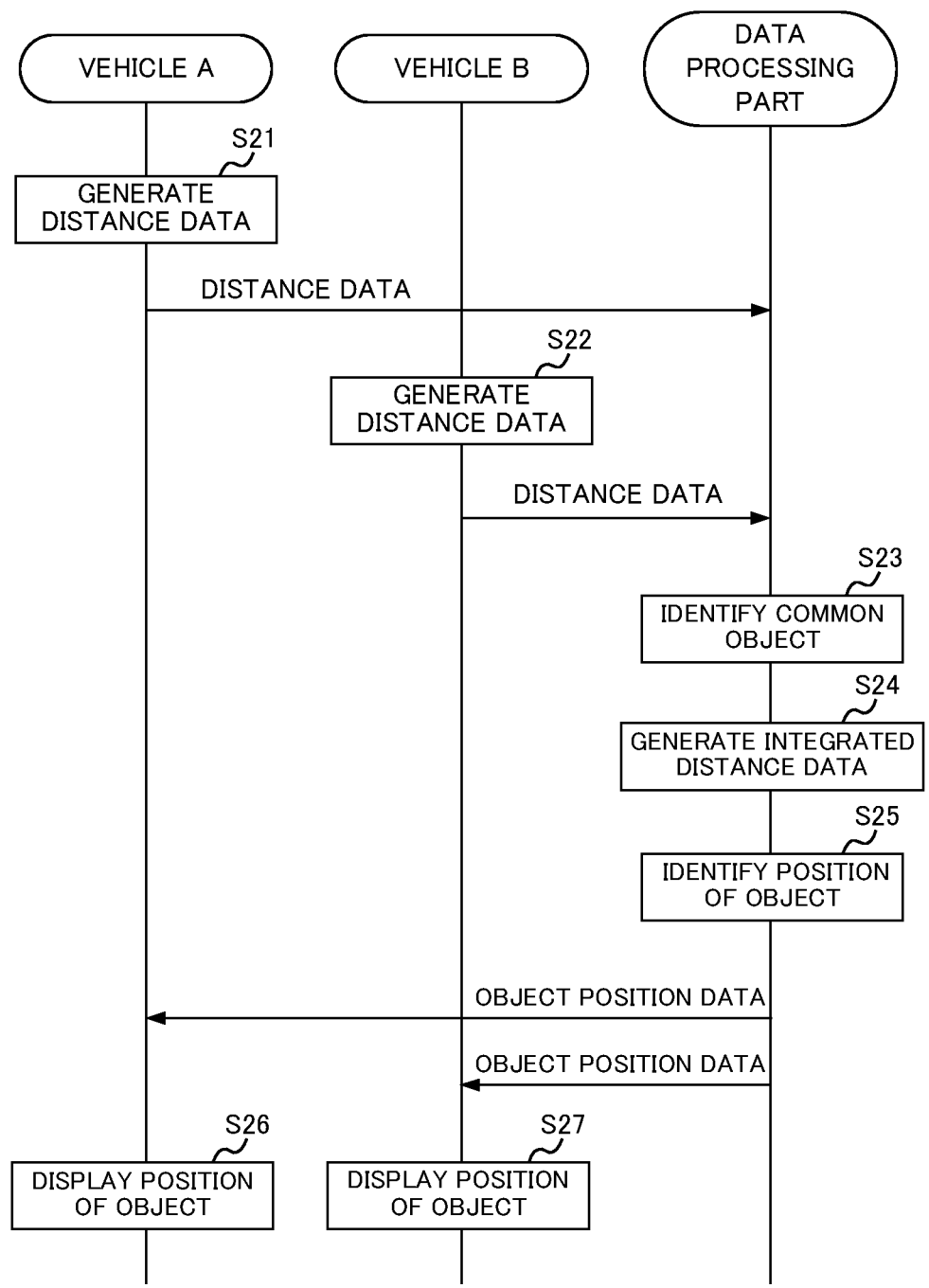
FIG. 10 is a sequence diagram showing processing in the driving support system 200.

FIG. 10 is a sequence diagram showing processing in the driving support system 200. The processing shown in the sequence diagram of FIG. 10 is repeatedly implemented.

The distance detection apparatus 11-1 mounted on the vehicle A generates distance data at predetermined time intervals and transmits the distance data to the data processing apparatus 12B (S21). The distance detection apparatus 11-2 mounted on the vehicle B also generates distance data at predetermined time intervals and transmits the distance data to the data processing apparatus 12B (S22).

The object identification part 124 identifies an object commonly included in the distance data received from the distance detection apparatus 11-1 and the distance data received from the distance detection apparatus 11-2 (S23). The integrated data generation part 129 generates integrated distance data by superposing the plurality of pieces of distance data such that positions of the object commonly included in the plurality of pieces of distance data are adjusted to match each other (S24). The position identification part 125 identifies the position of the object in the three-dimensional space by identifying the position of the object included in the integrated distance data (S25).

The position identification part 125 transmits object position data indicating the position of the identified object to the vehicle A and the vehicle B. The vehicle A and the vehicle B display the position of the object indicated by the received object position data on a map screen on a display (S26, S27), and control their traveling speeds or traveling positions on the basis of the position of the object.

[Effect of the Driving Support System 200]

As described above, in the driving support system 200, the position identification part 125 identifies the position of the object around the vehicle on the basis of the plurality of pieces of distance data generated by the plurality of distance detection apparatuses 11 mounted on the plurality of vehicles. Since the position identification part 125 can identify the position of the object included in any of the plurality of pieces of distance data, even when there is an obstacle between each vehicle and the object, the vehicle can recognize the position of the object around it. By using the position of the object recognized in the manner described above, the vehicle can (i) assist the driver in driving and (ii) activate autonomous driving.

The present disclosure is explained on the basis of the exemplary embodiments. The technical scope of the present disclosure is not limited to the scope explained in the above embodiments and it is possible to make various changes and modifications within the scope of the invention. For example, all or part of the apparatus can be configured with any unit which is functionally or physically distributed or integrated. Further, new exemplary embodiments generated by arbitrary combinations of them are included in the exemplary embodiments of the present disclosure. Further, effects of the new embodiment brought by the combinations also have the effect of the original exemplary embodiment together.

What is claimed is:

1. A position detection system for detecting a position of an object, including:
a plurality of distance detection apparatuses that generate distance data indicating distances to a plurality of positions on the object by detecting light reflected by the object in a predetermined three-dimensional space;
an object identification part that identifies the object included in one or more pieces of distance data among a plurality of pieces of the distance data generated by the plurality of distance detection apparatuses; and
a position identification part that identifies a position of the object in the three-dimensional space on the basis of (i) a position in the three-dimensional space of the distance detection apparatus that generated the distance data with which the object identification part identified the object and (ii) a position of the object in the distance data.

2. The position detection system according to claim 1, wherein each of the plurality of distance detection apparatuses generates a plurality of pieces of time-by-time distance data which are the distance data associated with a plurality of timings while the object is moving,
the object identification part identifies the object in one or more pieces of time-by-time distance data among the plurality of pieces of time-by-time distance data generated by the plurality of distance detection apparatuses at the same timing, and
the position identification part identifies positions of the object corresponding to the respective plurality of timings in the three-dimensional space on the basis of (i) the position in the three-dimensional space of the distance detection apparatus that generated the time-by-time distance data with which the object identification part identified the object and (ii) the positions of the object in the time-by-time distance data.

3. The position detection system according to claim 2, wherein the position identification part identifies the position of the object on condition that positions of the object in three-dimensional spaces corresponding to the plurality of pieces of time-by-time distance data corresponding to the same timing match.

4. The position detection system according to claim 1, further including
a storage part that stores geometry data indicating a three-dimensional geometry of the object, wherein the object identification part identifies the object by detecting, in the distance data, a region corresponding to the geometry data.

5. The position detection system according to claim 4, wherein the position identification part identifies the position of the object on condition that a relationship of a plurality of orientations of the object corresponding to the plurality of pieces of geometry data which the object identification part used for identifying the object by using the plurality of pieces of distance data generated by the plurality of distance detection apparatuses matches a relationship of a plurality of orientations of the plurality of distance detection apparatuses.

6. The position detection system according to claim 4, wherein the object is a probe to which a stylus that contacts a plurality of positions on an object to be measured while moving is coupled,
the geometry data is data indicating a geometry of the probe to which the stylus is coupled,
the object identification part identifies the probe corresponding to the geometry data in the distance data, and
the position identification part identifies a position of a tip of the stylus in the three-dimensional space by identifying the position of the tip of the stylus in the distance data on the basis of (i) the position of the probe in the distance data and (ii) a relationship between the position of the probe and the position of the stylus indicated by the geometry data.

7. A position detection system for detecting a position of an object, including:
a distance data acquisition part that acquires a plurality of pieces of distance data generated by a plurality of distance detection apparatuses that generate distance data indicating a distance to a position of the object by detecting light reflected by the object in a predetermined three-dimensional space;
an object identification part that identifies the object included in one or more pieces of distance data among the plurality of pieces of distance data; and
a position identification part that identifies a position of the object in the three-dimensional space on the basis of (i) a position in the three-dimensional space of the distance detection apparatus that generated the distance data with which the object identification part identified the object and (ii) a position of the object in the distance data.

8. The position detection system according to claim 7, wherein the distance data acquisition part acquires, from the plurality of moving distance detection apparatuses, position information indicating positions of the plurality of distance detection apparatuses in association with the distance data, and
the position identification part identifies the position of the object in the three-dimensional space on the basis of (i) the position in the three-dimensional space of the distance detection apparatus indicated by the position information and (ii) the position of the object in the distance data.

9. The position detection system according to claim 8, further including
an integration data generation part that generates integrated distance data corresponding to a three-dimensional space which is larger than the three-dimensional space corresponding to each of the plurality of pieces of distance data by arranging and integrating the plurality of pieces of distance data at a relative position corresponding to a relationship of the positions of the plurality of distance detection apparatuses indicated by the position information, wherein
the position identification part identifies a position of the object included in the integrated distance data.

10. The position detection system according to claim 9, wherein the object identification part identifies a common object commonly included in the plurality of pieces of distance data generated by the plurality of distance detection apparatuses,
the position detection system further includes
an integrated data generation part that generates integrated distance data corresponding to a space larger than a space corresponding to each of the plurality of pieces of distance data by arranging and integrating the plurality of pieces of distance data such that positions of the common object overlap, and the position identification part identifies a position of the object in the three-dimensional space by identifying a position of the object in the integrated distance data.

11. A three-dimensional geometry measurement system having a probe for measuring a three-dimensional geometry of an object to be measured, including:

a plurality of distance detection apparatuses that generate distance data indicating a distance to a position of the probe by detecting light reflected by the probe in a three-dimensional space in which the probe can move;

an object identification part that identifies the probe included in one or more pieces of distance data among a plurality of pieces of the distance data generated by the plurality of distance detection apparatuses;

a position identification part that identifies a position of the probe in the three-dimensional space on the basis of (i) a position in the three-dimensional space of the distance detection apparatus that generated the distance data with which the object identification part identified the object to be measured, and (ii) the position of the probe in the distance data; and a geometry identification part that outputs three-dimensional geometry data indicating a plurality of positions on the object to be measured separated by a difference between the position of the probe and the position of the object to be measured from a plurality of positions of the probe identified by the position identification part.

12. The three-dimensional geometry measurement system according to claim 11, wherein the probe is coupled to a stylus that contacts a plurality of positions on the object to be measured, and the geometry identification part outputs three-dimensional geometry data indicating a plurality of positions, where the stylus contacted the object to be measured, at which a relationship between the position of the probe and a position of a tip of the stylus is identified on the basis of the relationship between the position of the probe and the position of the object to be measured.

13. The three-dimensional geometry measurement system according to claim 12, wherein the method further includes a data acquisition part that acquires contact data indicating that the stylus is in contact with the object to be measured, and the geometry identification part outputs three-dimensional geometry data indicating a plurality of positions on the object to be measured corresponding to a plurality of positions of the probe identified by the position identification part while the contact data indicates that the stylus is in contact with the object to be measured.

14. The three-dimensional geometry measurement system according to claim 12, wherein the geometry identification part outputs three-dimensional geometry data indicating a plurality of positions on the object to be measured corresponding to a plurality of positions of the probe identified by the position identification part in a state where the position of the probe identified by the position identification part has not changed for a predetermined time or more.

15. The three-dimensional geometry measurement system according to claim 11, wherein the probe detects the object to be measured at a position in a predetermined relationship with the position of the probe, and the geometry identification part outputs three-dimensional geometry data indicating a plurality of positions on the object to be measured by correcting the position of the probe on the basis of the predetermined relationship.

16. The three-dimensional geometry measurement system according to claim 11, wherein the system includes a plurality of the probes, each having a different shape, the object identification part identifies the plurality of probes included in the distance data, the position identification part identifies positions of the plurality of probes, and the geometry identification part outputs three-dimensional geometry data indicating a plurality of positions on the object to be measured corresponding to the positions of the plurality of probes.

17. A position detection method for detecting a position of an object, the method including:

acquiring a plurality of pieces of distance data generated by a plurality of distance detection apparatuses that generates distance data indicating a distance to a position of the object by detecting light reflected by the object in a predetermined three-dimensional space;

identifying the object included in one or more pieces of distance data among the plurality of pieces of distance data; and identifying a position of the object in the three-dimensional space on the basis of (i) a position in the three-dimensional space of the distance detection apparatus that generated the distance data with which the object is identified and (ii) a position of the object in the distance data, that are executed by a computer.

* * * * *